(12) United States Patent  
Reifferscheid et al.

(10) Patent No.: US 12,115,743 B2
(45) Date of Patent: Oct. 15, 2024

(54) METHOD FOR REPAIRING STRUCTURED SURFACES

(71) Applicant: Lufthansa Technik AG, Hamburg (DE)

(72) Inventors: Moritz Reifferscheid, Basedow (DE); Heinrich Huber, Langenbach (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 262 days.

(21) Appl. No.: 17/636,907

(22) PCT Filed: Aug. 19, 2020

(86) PCT No.: PCT/EP2020/073170
§ 371 (c)(1),
(2) Date: Feb. 21, 2022

(87) PCT Pub. No.: WO2021/032771
PCT Pub. Date: Feb. 25, 2021

(65) Prior Publication Data
US 2022/0355557 A1    Nov. 10, 2022

(30) Foreign Application Priority Data
Aug. 22, 2019 (DE) ............... 10 2019 122 639.2

(51) Int. Cl.
*B29C 73/02* (2006.01)
*B29C 35/08* (2006.01)
(Continued)

(52) U.S. Cl.
CPC .......... *B29C 73/02* (2013.01); *B29C 35/0805* (2013.01); *B29C 73/26* (2013.01); *B29C 73/30* (2013.01); *B29C 2035/0827* (2013.01)

(58) Field of Classification Search
CPC ... B29C 43/021; B29C 33/3857; B29C 33/50; B29C 73/02; B29C 73/10; B29C 73/30; B29C 73/32
See application file for complete search history.

(56) References Cited

U.S. PATENT DOCUMENTS

| 4,086,113 A | 4/1978 | Cataffo et al. |
| 5,246,642 A | 9/1993 | Slaughter, Jr. |

(Continued)

FOREIGN PATENT DOCUMENTS

| CN | 103785988 A | 5/2014 |
| CN | 104275811 A | 1/2015 |

(Continued)

*Primary Examiner* — Nahida Sultana
*Assistant Examiner* — Mohamed K Ahmed Ali
(74) *Attorney, Agent, or Firm* — LEYDIG, VOIT & MAYER, LTD.

(57) ABSTRACT

A method refurbishes structured surfaces of a component having a damaged subregion with material detachment. The method comprising: determining a reference region having a similar surface structure as the subregion; while pressing a die material onto the reference region: curing the die material to form a transparent die which is separable from the reference region without leaving residues and has a negative shape of the surface structure of the reference region; filling the damage location with electromagnetic irradiation curable material; placing the die onto the curable material in the damage location with an alignment of the negative shape of the transparent die corresponding to a desired surface structure at the damage location; while the die is being pressed onto the damage location: irradiating the curable material with electromagnetic irradiation through the transparent die until the material is cured; and removing the die from the cured material without leaving residues.

9 Claims, 2 Drawing Sheets

(51) Int. Cl.
*B29C 73/26* (2006.01)
*B29C 73/30* (2006.01)

(56) References Cited

U.S. PATENT DOCUMENTS

| | | |
|---|---|---|
| 5,399,373 A | 3/1995 | Mrozinski |
| 5,462,702 A | 10/1995 | Slaughter, Jr. |
| 5,626,802 A | 5/1997 | Slaughter, Jr. |
| 2006/0198898 A1 | 9/2006 | Xu |
| 2015/0001768 A1 | 1/2015 | Kia et al. |
| 2017/0203524 A1* | 7/2017 | Huang .................. B29C 73/02 |
| 2019/0193347 A1 | 6/2019 | Yoshimura |
| 2019/0210308 A1 | 7/2019 | Marouzé |

FOREIGN PATENT DOCUMENTS

| | | |
|---|---|---|
| CN | 109311244 A | 2/2019 |
| CN | 109789650 A | 5/2019 |
| DE | 102017100509 A1 | 7/2017 |
| DE | 102017109362 A1 | 11/2017 |
| EP | 1683627 A1 | 7/2006 |
| GB | 1386691 A | 3/1975 |
| JP | 2006001125 A | 1/2006 |
| WO | WO 2016106364 A1 | 6/2016 |

\* cited by examiner

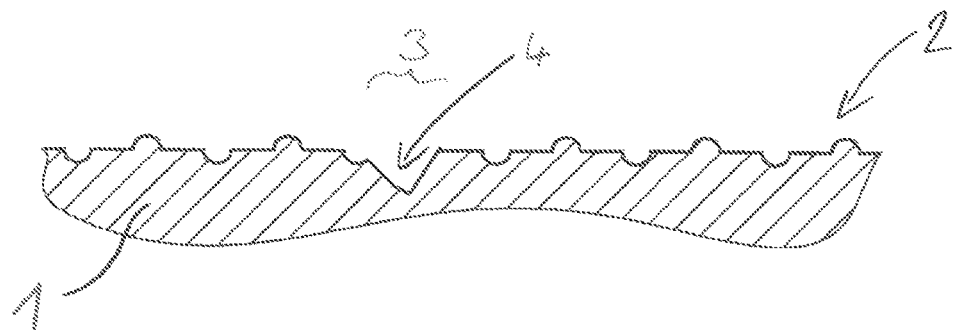
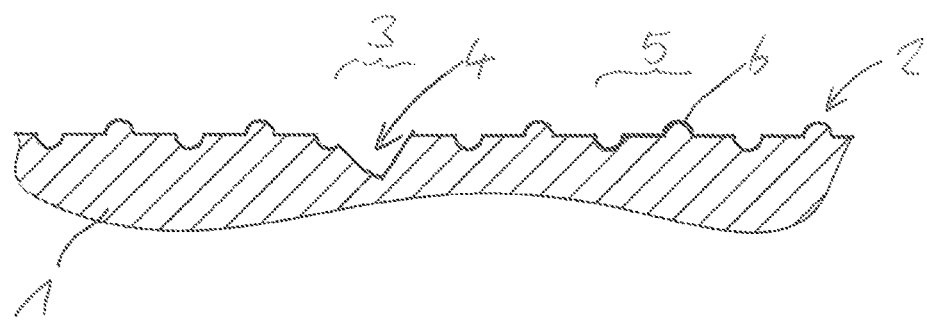
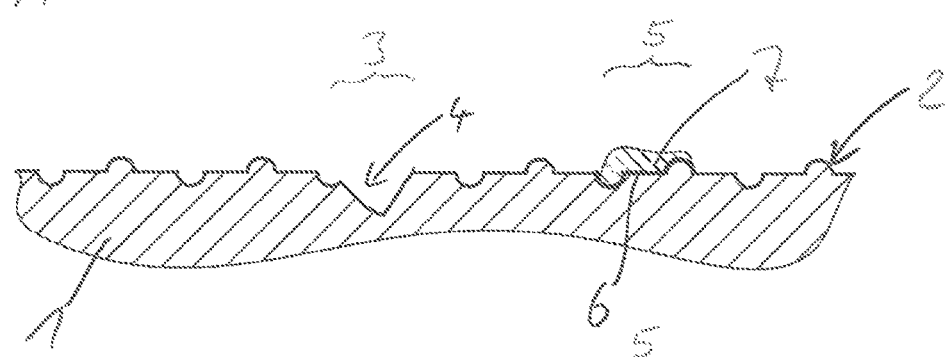
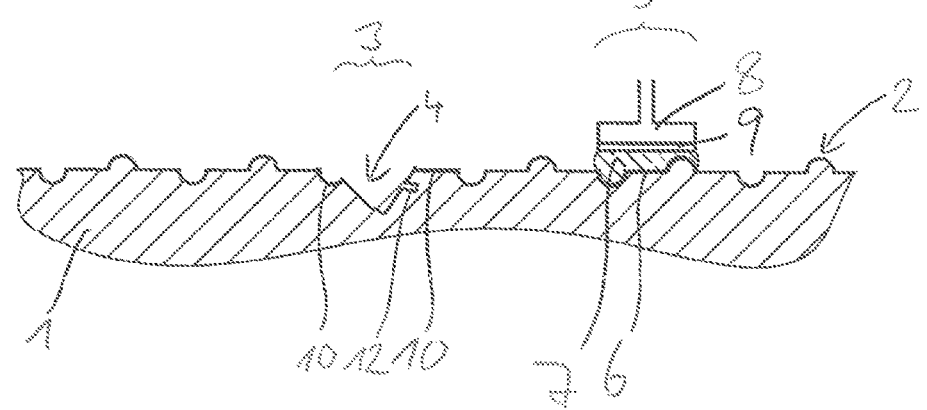

METHOD FOR REPAIRING STRUCTURED SURFACES

CROSS REFERENCE TO RELATED APPLICATIONS

This application is a U.S. National Phase application under 35 U.S.C. § 371 of International Application No. PCT/EP2020/073170, filed on Aug. 19, 2020, and claims benefit to German Patent Application No. DE 10 2019 122 639.2, filed on Aug. 22, 2019. The International Application was published in German on Feb. 25, 2021 as WO 2021/032771 A1 under PCT Article 21(2).

FIELD

The present disclosure relates to refurbishing structured surfaces of a component.

BACKGROUND

In the case of industrially produced components, those surfaces which face toward a user in the state of use may be surface-structured so as to impart a desired visual and/or tactile impression to the user. In particular, by structured surfaces together with suitable coloration, it is possible to generate the impression of a material other than the one actually used for the component. For example, wood or stone surfaces may be replicated particularly realistically by plastics if the wood grain, or the stone roughness, is reproduced on the surface of the component. Examples of corresponding components having structured surfaces are so-called designer floorings made of polyvinyl chloride (PVC), which may have a stone, tile or wood appearance, kitchen countertops made of synthetic resin with a stone appearance, or plastic veneers, such as are used on components for the interior decoration of aircraft, which have a wood appearance together with a corresponding grain.

In the event of damage to the structured surfaces of a component, by which a part of the structured surface is detached, for example because of spalling of the surface layer due to an impact, it is generally desired to refurbish the surface of the component so that there is no remaining visibility, or only minor remaining visibility, of the repaired location. This applies in particular for component surfaces when replacement of the entire component is not possible, or is possible only with a high cost.

Refurbishment of structured surfaces with a low remaining visibility is practicable in the current prior art only by very elaborate manual work requiring great craftsmanship, which is consequently very cost-intensive.

The embossing technique likewise used in the prior art, in which a material with which the fault location of a surface is filled is provided with surface structuring with the aid of an embossing stamp and is cured while applying the embossing stamp, is suitable—if at all—only for direction-independent small-scale random surface structures. However, particularly in the case of direction-dependent surface structures—for example the imitation of a wood grain—embossing errors generally occur so that the defect repaired in this way remains permanently and clearly visible. Furthermore, the materials that can be used for such a repair method are not suitable for every application since, for example, they are not sufficiently heat-resistant or do not satisfy the fire safety requirements.

SUMMARY

In an embodiment, the present disclosure provides a method that refurbishes structured surfaces of a component having a damaged subregion with material detachment. The method comprising: determining a reference region having a similar surface structure as the subregion; while pressing a die material onto the reference region: curing the die material to form a transparent die which is separable from the reference region without leaving residues and has a negative shape of the surface structure of the reference region; filling the damage location with electromagnetic irradiation curable material; placing the die onto the curable material in the damage location with an alignment of the negative shape of the transparent die corresponding to a desired surface structure at the damage location; while the die is being pressed onto the damage location: irradiating the curable material with electromagnetic irradiation through the transparent die until the material is cured; and removing the die from the cured material without leaving residues.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 1-8 show a schematic representation of the individual intermediate steps of the method according to an embodiment of the invention.

DETAILED DESCRIPTION

Figure 5:
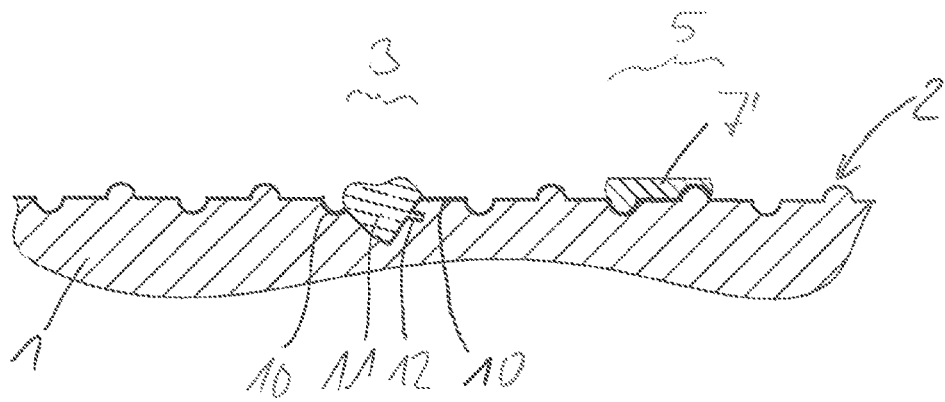

In an embodiment, the present invention provides a method for refurbishing structured surfaces of a component, with which the disadvantages from the prior art no longer occur, or only occur to a reduced extent.

Accordingly, an aspect of the invention relates to a method for refurbishing structured surfaces of a component having a damage location comprising material detachment in a subregion of the surface, having the steps:

a) determining a reference region, having at least a similar surface structure, for the subregion;
b) applying a curable die material, which is transparent at least in the cured state, onto the reference region;
c) while the die material is being pressed onto the reference region with an application pressure: curing the die material to form a transparent die which can be separated from the reference region without leaving residues and has the negative shape of the surface structure of the reference region;
d) filling the damage location of the subregion with material that can be cured with electromagnetic irradiation;
e) placing the die onto the curable material in the damage location with an alignment of the negative shape of the transparent die corresponding to the desired surface structure at the damage location;
f) while the die is being pressed onto the damage location with an application pressure: irradiating the curable material with electromagnetic irradiation through the transparent die until the material is cured; and
g) removing the die from the cured material at the damage location without leaving residues.

The method, according to an embodiment of the present invention, makes it possible to refurbish structured surfaces, on which a part of the material forming the surface of the component has been detached, of a component. A corresponding damage location may, for example, involve spalling, impact damage, or deep scratches. It has been found that a damage location repaired by the method according to an embodiment of the present invention is in general scarcely visible in respect of the surface structure and may also comply with the requirements, for example in respect of thermal or mechanical loads or fire safety, which may if necessary also be increased. Both advantages can be achieved by the use, provided according to one or more embodiments of the invention, of a transparent die for shaping the structure on the surface in the region of the damage location: because of the transparency of the die, on the one hand it can be aligned accurately so that embossing errors can be prevented effectively, and on the other hand because of the transparency it is possible to use a material that can be cured with electromagnetic irradiation, which can be irradiated suitably through the die for the curing, in order to fill the damage location.

In order to minimize the remaining visibility of a refurbished damage location, according to embodiments of the invention, the die used for the subsequent refurbishment for the damage location to be refurbished is furthermore formed with the aid of a reference region—that is to say a region which is similar, preferably identical, to the subregion having the damage location in respect of the surface structure—in order to achieve best possible matching of the surface structure in the area of the damage location. The reference region may in this case be found on the same component as the one on which the damage location to be refurbished is also located. This applies particularly for repeating surface structures. As an alternative, it is also possible for the reference region to be found on a damage-free component which is identical to the component to be refurbished. In this case, the reference region on the damage-free component may be selected in an identical way to the subregion having the damage location. In other words, the die may thus be produced at precisely the location on the damage-free component where the damage location lies on the component to be refurbished. Such a procedure is possible in particular for components industrially produced serially.

After having determined a suitable reference region, curable die material, which is transparent at least in the cured state, is applied onto the entire reference region. For example, the die material may be a transparent resin. The resin may, for example, be an epoxy resin, an acrylic resin or a polyurethane resin. What is essential is merely that the resin in the cured state is transparent and furthermore sufficiently geometrically stable to give the shape subsequently for the curable material. In order to reliably ensure the subsequent separation of the cured die without leaving residues, a suitable release agent may if necessary be applied onto the reference region before the application of the die material.

The curable die material is then pressed onto the reference region with a predetermined or freely selected application pressure and then cured. The curing may be carried out in accordance with the material properties of the die material, and if necessary stimulated for example thermally or by electromagnetic irradiation, for example by (UV) light. It is also possible for the die material to be cured as a result of a chemical reaction, for example of two constituents mixed shortly before application.

After curing has taken place, a transparent die which can be separated without leaving residues and has the negative shape of the surface structure of the reference region is obtained.

After or in parallel with the formation of the transparent die, the actual damage location in the subregion of the component to be refurbished is filled with material that can be cured by electromagnetic radiation, that is to say in particular visible light or UV radiation. In this case, the damage location may if necessary be enlarged before filling with curable material, in order to increase the contact region between the material in question and the component. It is also possible, if necessary, to introduce an undercut so that the subsequent connection between the material and the component comprises not only a material bond but also a form-fit.

The curable material may preferably be a resin, for example based on epoxide, acrylate or polyurethane. The resin may in this case be selected in such a way that it has the desired or prescribed properties in the cured state, for example in respect of thermal or mechanical stability or fire safety. Of course, it is preferred for the hue of the curable material to be selected according to the hue of the surface at the damage location. In this case, in particular, the hue of the material in the cured state is relevant in order to achieve the lowest possible remaining visibility of the refurbished damage location.

After the damage location of the subregion has been filled with material that can be cured with electromagnetic irradiation, the die previously formed is subsequently placed onto the curable material in the damage location with an alignment of the negative shape of the transparent die corresponding to the desired surface structure at the damage location. Since according to the method according to an embodiment of the invention the die is transparent, the correct alignment of the die may be checked directly. The correct alignment along all three axes is in this case essential in order to minimize the remaining visibility of a refurbished damage location.

The die is then pressed onto the damage location with an application pressure. The application pressure is in this case preferably the same as the application pressure during the curing of the die material in order to form the die. For example, the pressing stamp which was previously used during the curing of the die material may be employed for the pressing.

If the die is not matched in its contour to the contour of the damage location, for example by corresponding finishing, so that excess curable material may possibly emerge laterally beyond the die from the damage location, the damage location and/or the die may be provided with an outlet for excess curable material. The fact that possible excess material can emerge ensures that the future surface is flush with the surrounding subregion in the area of the damage location.

In order to prevent material which possibly emerges from adhering on the subregion surrounding the damage location, the subregion around the damage location may be provided with a release agent before the damage location is filled with curable material.

Once the die has been pressed as described onto the curable material in the previously checked placement, it may be irradiated electromagnetically through the transparent die, for example with light in the visible and/or UV range, at a wavelength suitable for the curing, until it is fully cured.

Once the die has subsequently been removed from the cured material at the damage location without leaving residues, the refurbishment of the structured surface is in many cases already fully completed. Only in cases in which, for example, a particular surface gloss is required in order to reduce the remaining visibility further, the cured material may if necessary be finished with a top coating after removal of the die.

It has been found that surfaces, structured by the method according to one or more embodiments of the invention, of a component having a damage location comprising material detachment in a subregion of the surface may be refurbished efficiently and economically without the repaired damage location still being directly identifiable afterwards.

FIGS. 1 to 8 show exemplary individual steps of the method according to an embodiment of the invention with the aid of a surface 2, represented in cross section, of a component 1. The surface 2 of the component 1 is structured and has both indentations and elevations.

In the starting state shown in FIG. 1, in a subregion 3 of the surface 2, there is a damage location 4 in which there is material detachment due to an impact with a sharp object.

In order to refurbish the structured surface 2, a reference region 5, the surface structure of which matches with the surface structure of the subregion 3 in the original state, and therefore in the state to be restored, is initially selected. In the present example, a suitable reference region 5 is located directly on the component 1 which also has the damage location 4. It is, however, also possible to use a reference region 5 on a component which is identical to the component 1 but is not damaged, in which case the reference region 5 may be selected on the identical component at the location similar to the subregion 3.

A release agent 6, which can be removed at a later time without leaving residues, is applied in the area of the reference region 5 (FIG. 2).

A die material 7, which can be cured by irradiation with UV light and is transparent in the cured state, and which can later be separated in the cured state nondestructively from the surface 2 without leaving residues, is subsequently applied in the area of the reference region 5 (FIG. 3).

For the curing, an application pressure is exerted onto the die material 7 with the aid of the pressing stamp 8. On the surface facing toward the die material 7, the pressing stamp 8 in this case has a flat UV light source 9 (for example formed from LED panels) or a light exit window suitable for an internally placed UV light source. While the die material 7 is being pressed onto the surface 2 in this way, electromagnetic irradiation with UV light is simultaneously carried out so that the die material 7 solidifies to form a transparent die 7' (cf. FIG. 5).

In parallel with this, the damage location 4 is prepared for refurbishment by—besides cleaning the damage location 4—enlarging the damage location 4 by creating a small transverse hole 12, for example by drilling, in such a way as to form an undercut by means of which the material filling the damage location 4 is finally secured in the damage location 4 not only by a material bond but also by a form-fit.

A release agent 10, which is intended to be used to prevent the curable material 11 with which the damage location 4 is subsequently filled from adhering in areas of the surface 2 which are not in fact damaged, is again applied in the area of the subregion 3 around the actual damage location.

As shown in FIG. 5, the damage location 4, including the transverse hole 12, is filled with material 11 that can be cured by electromagnetic irradiation in the UV range. The material 11—for example an epoxy resin—is in this case selected in such a way that in the cured state it assumes a hue corresponding to the hue of the surface 2.

Figure 6:
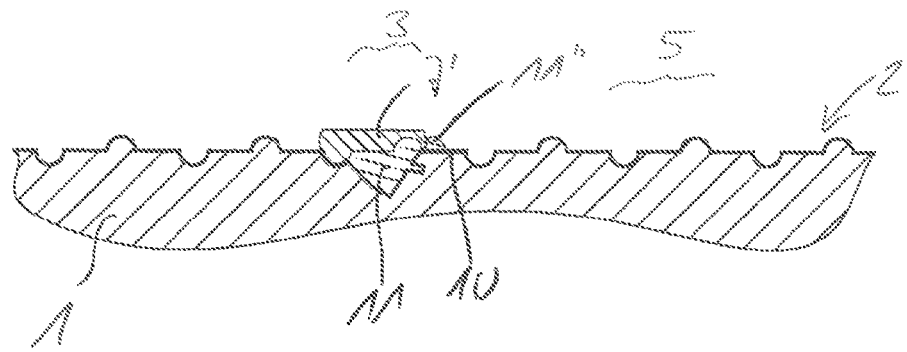
Figure 7:
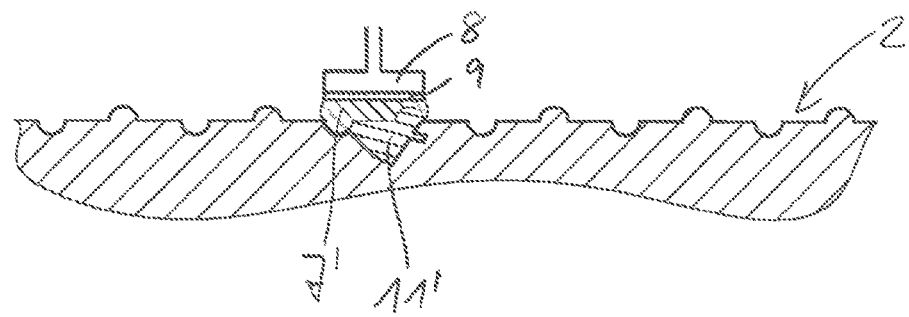

Subsequently, the transparent die 7' previously produced is taken from the reference region 5 and placed onto the curable material 11. Because of the transparency of the die 7', it can be aligned on the subregion 3 in such a way that the negative shape of the reference region 5 on its lower side corresponds to the negative of the desired future shape of the surface 2 in the subregion 3 (FIG. 6). This is essential so that the subsequently remaining visibility of the refurbished damage location 4 is as low as possible. Possible excess material 11" may in this case emerge laterally below the die 7' and—because of the release agent 10—may be removed without leaving residues.

The die 7' is subsequently pressed with the pressing stamp 8 already used beforehand onto the material 11 (FIG. 7), so that the latter is pressed onto the surface in the damage location 4. In this case, the same application pressure as in the step shown in FIG. 4 is exerted onto the die 7'. During this, the UV-curable material 11' is converted into cured material 11' with the aid of the electromagnetic radiation emitted by the UV light source 9 and passing through the transparent die 7'.

Figure 8:
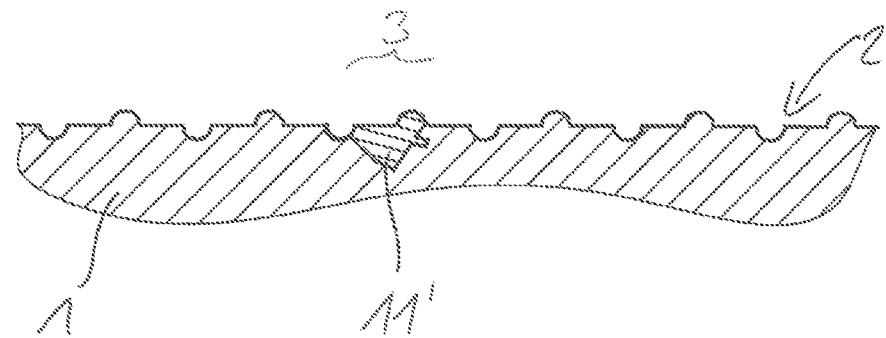

After full curing of the material 11', the pressing stamp 8 and the die 7' may be removed, and the surface 2 of the component 1 in the subregion 3 having the original damage location 4 has been refurbished (FIG. 8). If necessary, the cured material 11' may subsequently also be finished with a top coating, for example in order to achieve a gloss which is matched to the rest of the surface 2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for refurbishing structured surfaces of a component having a damage location comprising material detachment in a subregion of the surface, the method comprising:
   a) determining a reference region for the subregion, the reference region having a similar surface structure as the subregion;

b) applying a curable die material, which is transparent at least in a cured state, onto the reference region;

c) while the curable die material is being pressed onto the reference region with an application pressure: curing the curable die material to form a transparent die which is separable from the reference region without leaving residues and has a negative shape of the surface structure of the reference region;

d) filling the damage location of the subregion with material that is curable with electromagnetic irradiation;

e) placing the transparent die onto the curable material in the damage location with an alignment of the negative shape of the transparent die corresponding to a desired surface structure at the damage location;

f) while the transparent die is being pressed onto the damage location with an application pressure: irradiating the curable material with electromagnetic irradiation through the transparent die until the material is cured; and g) removing the transparent die from the cured material at the damage location without leaving residues, wherein the application pressure is the same in steps c) and f).

2. The method as claimed in claim 1, wherein the reference region is selected on the component that has the damage location to be refurbished or on an undamaged identical component.

3. The method as claimed in claim 1, wherein the damage location or the transparent die is provided with an outlet for excess curable material.

4. The method as claimed in claim 1, wherein the damage location is enlarged by material erosion before filling with curable material.

5. The method as claimed in claim 1, wherein before filling the damage location with curable material, the subregion around the damage location is provided with a release agent to prevent adhesion of the curable material thereon.

6. The method as claimed in claim 1, wherein the curable material is a curable resin that can preferably be cured by ultraviolet (UV) light.

7. The method as claimed in claim 1, wherein the hue of the curable material is selected according to the hue of the surface at the damage location.

8. The method as claimed in claim 1, wherein the cured material is finished with a top coating after removal of the transparent die.

9. The method as claimed in claim 1, wherein the transparent die is transparent throughout a visible and UV range.

\* \* \* \* \*